(12) United States Patent
Li (10) Patent No.: US 12,329,123 B1
(45) Date of Patent: Jun. 17, 2025

(54) ANIMAL SORTING DEVICE

(71) Applicant: Shen Li, Guangzhou (CN)

(72) Inventor: Shen Li, Guangzhou (CN)

( * ) Notice: Subject to any disclaimer, the term of this patent is extended or adjusted under 35 U.S.C. 154(b) by 0 days.

(21) Appl. No.: 18/973,541

(22) Filed: Dec. 9, 2024

(30) Foreign Application Priority Data

Nov. 5, 2024 (CN) .......................... 202422694724.2

(51) Int. Cl.
*A01K 1/00* (2006.01)

(52) U.S. Cl.
CPC .................................. *A01K 1/0023* (2013.01)

(58) Field of Classification Search
CPC ........ A01K 1/0023; A01K 1/031; A01K 1/03; A01K 1/0041
See application file for complete search history.

(56) References Cited

U.S. PATENT DOCUMENTS

| | | | | | |
|---|---|---|---|---|---|
| 4,448,150 | A | * | 5/1984 | Catsimpoolas | A01K 1/031 250/221 |
| 10,111,401 | B2 | * | 10/2018 | Hofman | A01J 7/04 |
| 11,653,623 | B2 | * | 5/2023 | Rybczynski | A01K 1/126 119/14.02 |
| 2011/0308465 | A1 | * | 12/2011 | Siddell | A01K 1/12 119/14.08 |
| 2012/0006269 | A1 | * | 1/2012 | McCain | A01J 5/007 119/14.08 |
| 2012/0216748 | A1 | * | 8/2012 | Hofman | A01K 1/126 119/14.08 |
| 2023/0046736 | A1 | * | 2/2023 | Tierney | A01K 1/031 |

FOREIGN PATENT DOCUMENTS

| | | | | |
|---|---|---|---|---|
| WO | WO-8908979 A1 | * | 10/1989 | A01K 1/00 |
| WO | WO-2008154247 A1 | * | 12/2008 | A01K 1/0613 |
| WO | WO-2014102842 A2 | * | 7/2014 | A01K 1/12 |

* cited by examiner

*Primary Examiner* — Joshua D Huson
*Assistant Examiner* — Alanna K Peterson (57) ABSTRACT

An animal sorting device, including a housing, a sorting box, a placement box, and a screening device, where the sorting box is located in the housing, and a screening channel is formed in the sorting box and is provided with a material inlet and a material outlet; the placement box is located in the housing and communicates with the material outlet of the screening channel; and the screening device is disposed on the sorting box and includes an RFID module and a closing mechanism. According to the animal sorting device in the present disclosure, the animals are placed in the sorting box, the tags on the animals are identified by the screening device, and the animals fall into different placement boxes to implement sorting of the animals, thereby reducing the error rate of manual screening, and improving the efficiency of animal screening.

10 Claims, 5 Drawing Sheets

ANIMAL SORTING DEVICE

CROSS-REFERENCE TO RELATED APPLICATIONS

The application claims priority of Chinese patent application CN2024226947242, filed on Nov. 5, 2024, which is incorporated herein by reference in its entireties.

TECHNICAL FIELD

The present disclosure relates to the field of utilizing small animals for research, in particular to an animal sorting device.

BACKGROUND

In experimental projects, small animals are often used to assist in experiments, which play an extremely important role in improving human quality of life, developing biomedical technology, and promoting socio-economic development. In biomedical research laboratories, manual methods are still used to sort animals into study groups which results in low degree of automation, inefficiency, and the likelihood of errors.

SUMMARY

The present disclosure aims to provide an animal sorting device, to solve the problems in biomedical research laboratories where manual methods are still used for sorting small animals, which results in low degree of automation, inefficiency, and the likelihood of errors.

To solve the above technical problems, the present disclosure adopts the following technical solution:

An animal sorting device, including:
  a housing;
  a sorting box located in the housing, where a screening channel is formed in the sorting box and is provided with a material inlet and a material outlet;
  a placement box that is located in the housing and communicates with the material outlet of the screening channel; and
  a screening device disposed on the sorting box, where the screening device includes an RFID module and a closing mechanism, the RFID module is disposed in the screening channel and is capable of identifying RFID tags of animals and screening the animals, and the closing mechanism is capable of closing or opening the material outlet of the screening channel.

Optionally, the screening channel comprises a first channel and a second channel that communicate with each other, the first channel communicates with the second channel, the material inlet is formed in the first channel, the material outlet is formed in the second channel and faces the placement box, the first channel extends along a vertical direction and communicates with the outside by the material inlet, an extension direction of the second channel is inclined to the vertical direction, and the RFID module is located on a sidewall of the second channel.

Optionally, the closing mechanism comprises a baffle plate and a motor, the baffle plate is connected to the motor, and the motor drives the baffle plate to rotate to open or close the material outlet.

Optionally, further comprising a rotary motor that is electrically connected to the placement box and is capable of driving the placement box to rotate relative to the sorting box.

Optionally, further comprising a rotary table, wherein the placement box is placed on the rotary table, and the rotary motor drives the rotary table to rotate relative to the sorting box, so that the placement box is driven to rotate relative to the sorting box.

Optionally, the housing comprises an outer housing and two door panels that are disposed on a same side surface of the outer housing and are both rotatably connected to the outer housing.

Optionally, each of the door panels is provided with a first magnetic attraction component, the outer housing is correspondingly provided with a second magnetic attraction component, and the first magnetic attraction component is magnetically attracted to the second magnetic attraction component to limit rotation of the door panel relative to the outer housing.

Optionally, further comprising a through-beam grating protection device and a positioning pin, wherein the through-beam grating protection device is disposed on a side surface of the housing, the positioning pin is disposed on a bottom surface of the housing and connected to the placement box, and the through-beam grating protection device is capable of controlling the positioning pin to lock the placement box, so as to limit rotation of the placement box relative to the sorting box.

Optionally, further comprising an electric control box that provides a power supply for the screening device and is capable of controlling the screening device to work.

Optionally, the electric control box is provided with a power supply switch, a sorting switch, and an emergency stop switch, and the power supply switch controls a total power supply of the animal sorting device and provides the power supply for the screening device; the sorting switch controls the power supply of the screening device; and the emergency stop switch is configured to cut off the power supply in case of emergency.

It can be seen from the above technical solution that the embodiment of the present disclosure has at least the following advantages and positive effects:

In the embodiment of the present disclosure, the animal sorting device includes the housing, the sorting box, the placement box, and the screening device, where the sorting box, the placement box, and the screening device are all placed in the housing. The animals are placed in the sorting box, the tags on the animals are identified by the screening device, and the animals fall into different placement boxes to implement sorting of the animals, thereby reducing the error rate of manual screening, and improving the efficiency of animal screening.

BRIEF DESCRIPTION OF THE DRAWINGS

To more clearly illustrate the technical solutions in the embodiments of the present disclosure or in the prior art, the accompanying drawings that need to be used in the description of the embodiments or the prior art will be briefly introduced below. Apparently, the accompanying drawings in the description below merely illustrate some embodiments of the present disclosure. Those of ordinary skill in the art may also derive other accompanying drawings from these accompanying drawings without creative efforts.

DESCRIPTION OF REFERENCE SIGNS IS AS FOLLOWS 10. animal sorting device;
100. housing;
110. outer housing;
111. side plate;
112. bottom plate;
113. second magnetic attraction component;
120. door panel;
121. first magnetic attraction component;
200. sorting box;
210. screening channel;
211. material inlet;
212. material outlet;
213. first channel;
214. second channel;
300. placement box;
310. small box;
400. screening device;
410. RFID module;
420. closing mechanism;
421. baffle plate;
422. motor;
500. rotary motor;
600. rotary table;
700. through-beam grating protection device;
800. positioning pin;
900. electric control box;
910. power supply switch;
920. sorting switch; and
930. emergency stop switch.

DETAILED DESCRIPTION OF THE EMBODIMENTS

Typical embodiments that embody the features and advantages of the present disclosure will be described in detail in the following description. It should be understood that the present disclosure can have various changes in different embodiments without departing from the scope of the present disclosure, and the description and drawings therein are essentially for illustrative purposes and not intended to limit the present disclosure.

In addition, the terms "first" and "second" are only for descriptive purposes, and cannot be construed as indicating or implying relative importance or implying the number of technical features indicated. Thus, the features defined with "first" and "second" may explicitly or implicitly include one or more of the features. In the description of the present disclosure, "a plurality of" means two or more, unless otherwise expressly and specifically defined.

In the description of the present disclosure, it is to be noted that the terms "dispose", "connected", and "connection" should be understood in a broad sense, unless otherwise expressly specified and limited. For example, it may be a fixed connection, a detachable connection, or an integrated connection; it may be a mechanical connection or an electrical connection; and it may be being directly connected, being indirectly connected via an intermediate medium, or a communication between interiors of two elements. Those of ordinary skill in the art may understand specific meanings of the above terms in the present disclosure according to specific circumstances.

Figure 1:
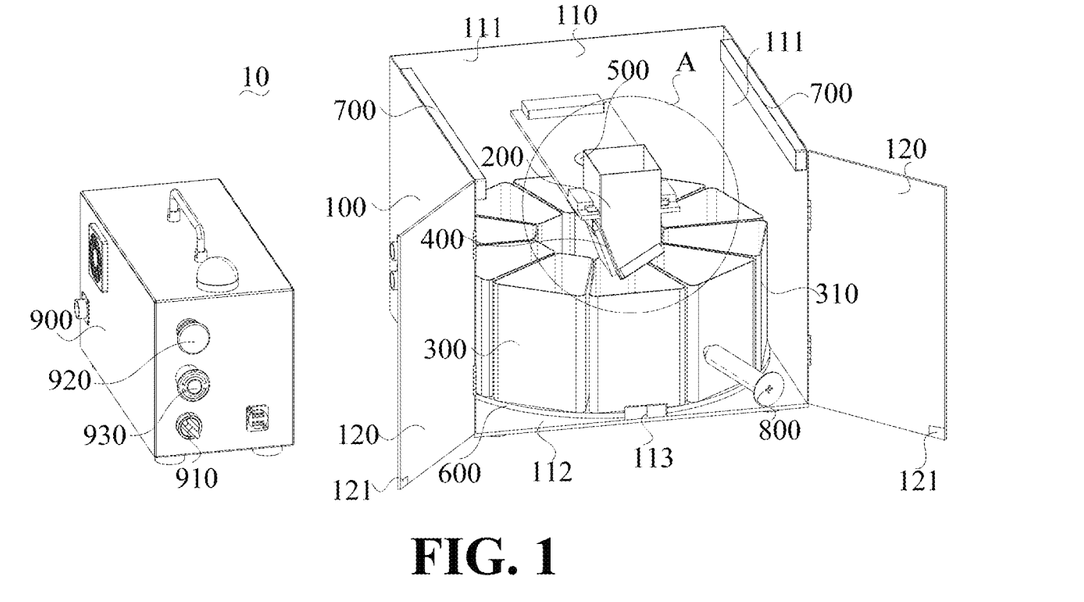
FIG. 1 is a schematic diagram of an overall structure of an animal sorting device in an embodiment of the present disclosure.

First, referring to FIG. 1, the present disclosure provides an animal sorting device 10, which is configured to sort experimental animals. The animal sorting device 10 can automatically identify the animals, effectively improve the efficiency of animal screening, and effectively reduce the possibility of wrong screening.

It is to be noted that the animals include but are not limited to mice and rabbits.

Figure 2:
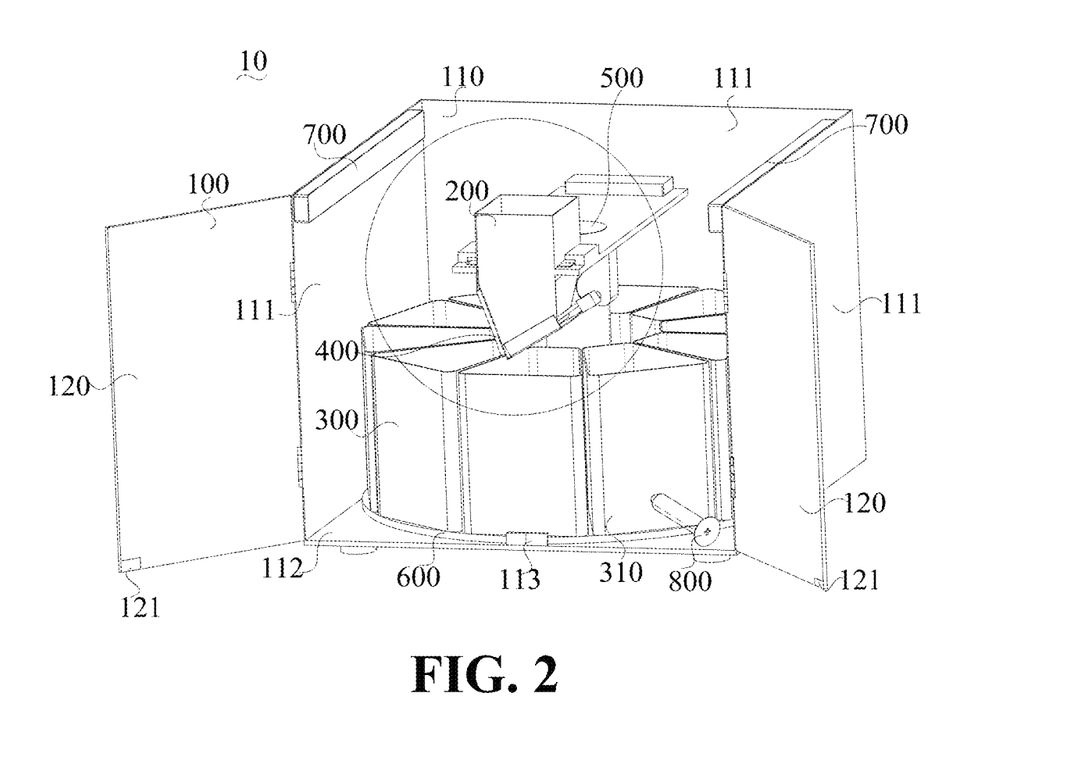
FIG. 2 is a schematic structural diagram of the animal sorting device shown in FIG. 1 from another perspective.

Referring to FIG. 1 and FIG. 2, the animal sorting device 10 includes a housing 100, a sorting box 200, and a placement box 300, where the sorting box 200 and the placement box 300 are both placed in the housing 100, the sorting box 200 is aligned with the placement box 300 in a vertical direction, the sorting box 200 is configured to identify and screen the animals, and the placement box 300 is configured to place the screened animals.

Referring to FIG. 1 and FIG. 2, it is to be noted that the housing 110 includes a bottom plate 112 and a plurality of side plates 111. In this embodiment, the number of side plates 111 is set to three, and the door panels 120 are disposed on the side surface without the side plates 111. The number of side plates 111 is not specifically limited in the present disclosure.

Referring to FIG. 1 and FIG. 2, it is to be noted that the housing 110 includes a bottom plate 111 and a plurality of side plates 112. In this embodiment, the number of side plates 112 is set to three, and the door panels 120 are disposed on the side surface without the side plates 112. The number of side plates 112 is not specifically limited in the present disclosure.

It is to be noted that the number of door panels 120 is set to one in other embodiments. The number of door panels 120 is not specifically limited in the present disclosure.

Referring to FIG. 1 and FIG. 2, it is to be noted that in this embodiment, the door panel 120 is provided with a first magnetic attraction component 121, the outer housing 110 is provided with a second magnetic attraction component 113, and the first magnetic attraction component 121 is magnetically attracted to the second magnetic attraction component 113. The door panel 120 cannot rotate relative to the outer housing 110. The outer housing 110 and the door panels 120 define a cuboid. The outer housing 110 and the door panels 120 can prevent a hand or other parts of a user from entering the housing 100 during use, so that the user can be effectively prevented from being injured when using the animal sorting device 10. It can be understood that the first magnetic attraction component 121 and the second magnetic attraction component 113 may also not be provided, as long as there is any solution where the housing 100 includes the door panels 120 and the outer housing 110, and the any solution should be protected.

It is to be noted that in other embodiments, the door panel 120 is provided with a protrusion, the outer housing 110 is provided with a groove, and the protrusion is snapped into the groove to limit rotation of the door panel 120 relative to the outer housing 110.

Figure 3:
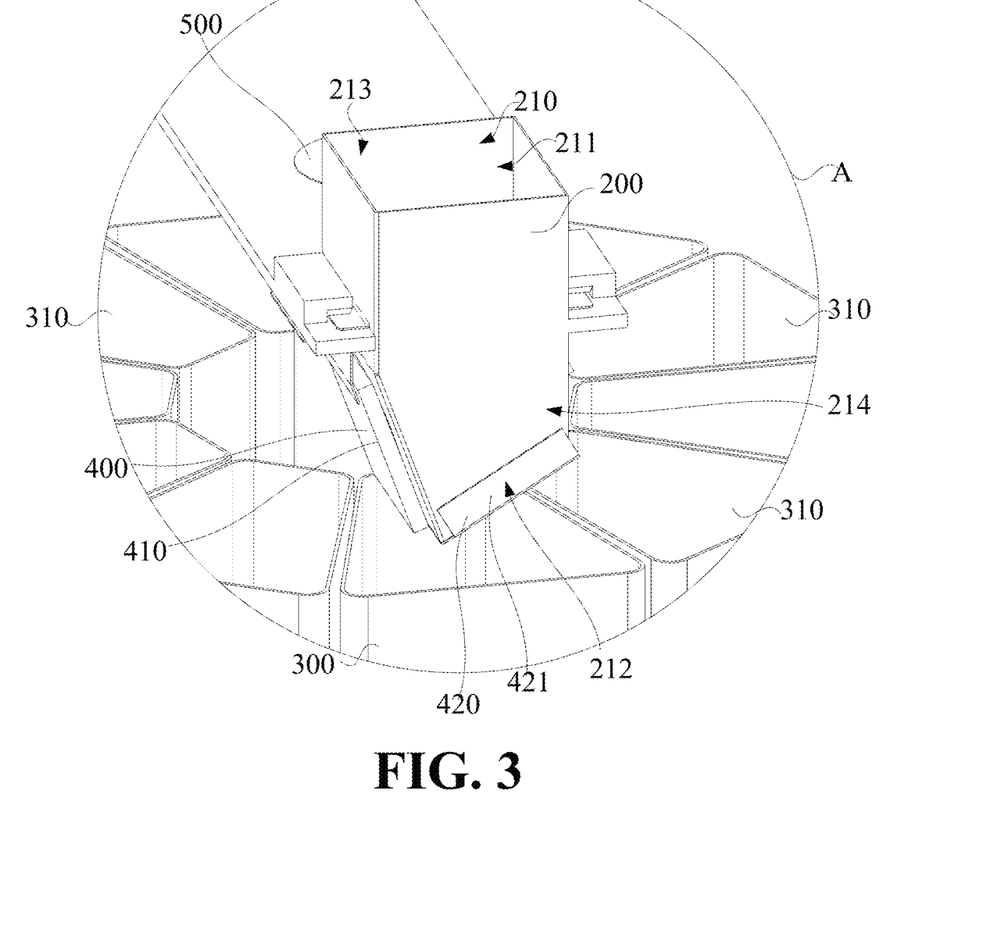
FIG. 3 is a schematic partial enlarged view of an area A of the animal sorting device shown in FIG. 1.
Figure 4:
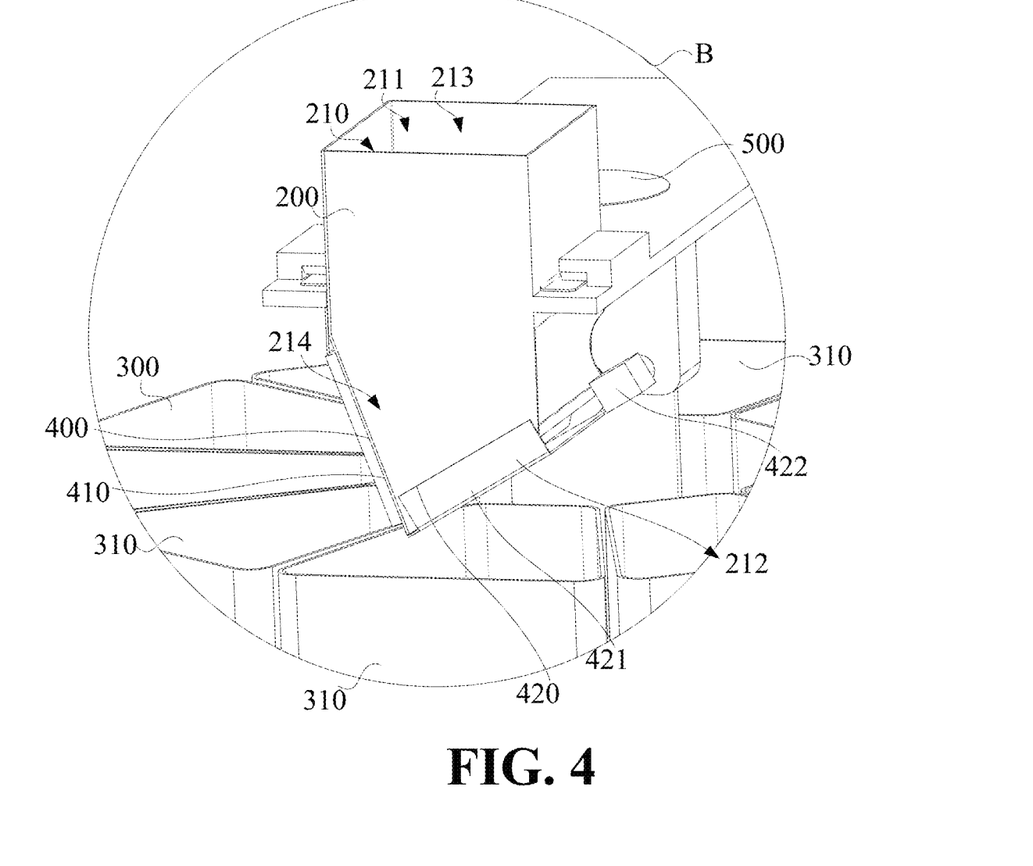
FIG. 4 is a schematic partial enlarged view of an area B of the animal sorting device shown in FIG. 2.

Referring to FIG. 3 and FIG. 4, the sorting box 200 is provided with a screening channel 210, the screening channel 210 is provided with a material inlet 211 and a material outlet 212 that are opposite, and the material outlet 212 of the screening channel 210 communicates with the placement box 300. The animals enter the screening channel 210 from the material inlet 211, leave the screening channel 210 from the material outlet 212, and enter the placement box 300.

Figure 5:
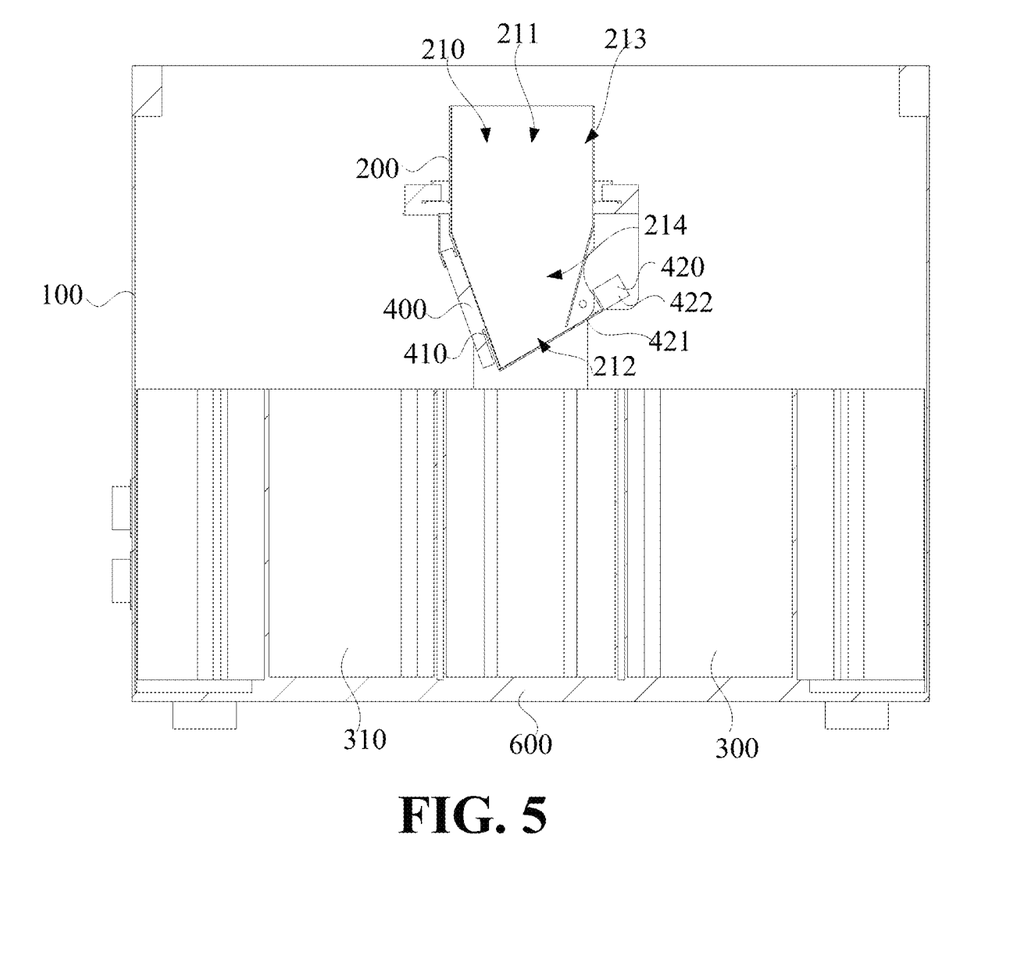
FIG. 5 is a schematic diagram of a sectional structure of the animal sorting device shown in FIG. 1.

Referring to FIG. 4 and FIG. 5, the screening channel 210 includes a first channel 213 and a second channel 214 that communicate with each other, where the first channel 213 communicates with the second channel 214, the material inlet 211 is formed in one end of the first channel 213 away from the second channel 214, the material outlet 212 is formed in one end of the second channel 214 away from the first channel 213, the material outlet 212 faces the placement box 300, the first channel 213 extends along a vertical direction, the first channel 213 communicates with the outside by the material inlet 211, and an extension direction of the second channel 214 is inclined to the vertical direction. The animals can enter the first channel 213 from the material inlet 211, and after entering the second channel 214 through one end of the first channel 213 close to the second channel 214, the animals entering the first channel 213 leave the second channel 214 through the material outlet 212 and enter the placement box 300.

Figure 6:
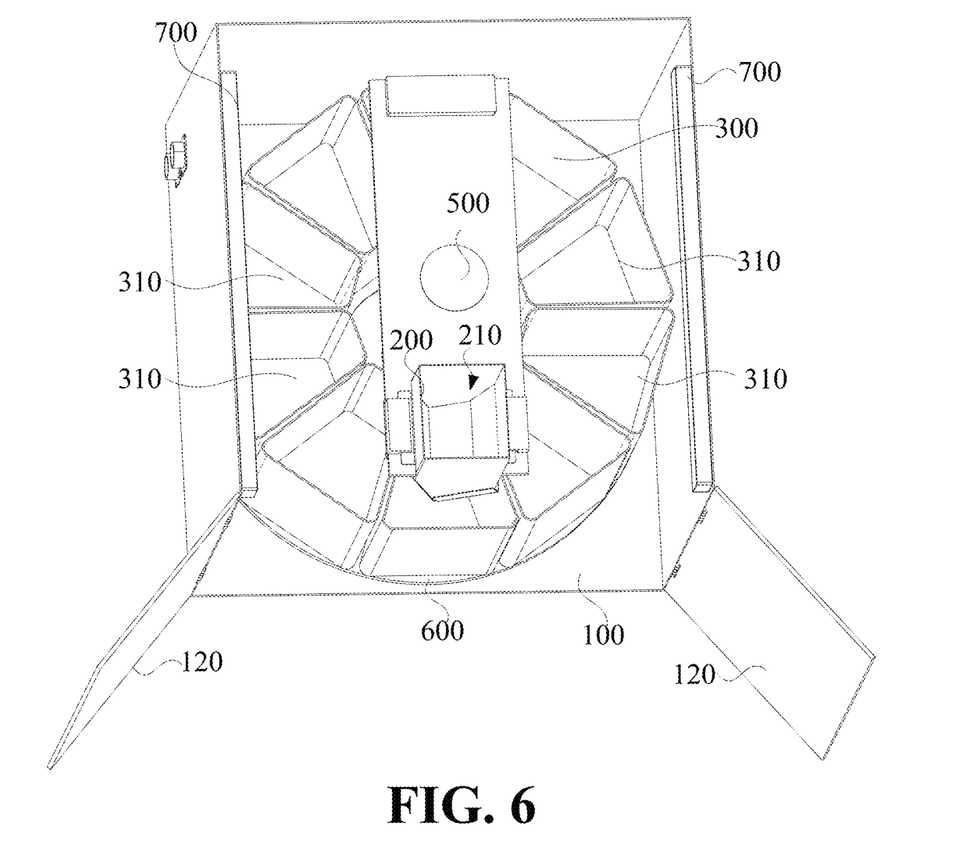
FIG. 6 is a schematic top view of the animal sorting device shown in FIG. 1.

Referring to FIG. 2 and FIG. 6, the placement box 300 is provided with a plurality of small boxes 310. In this embodiment, the placement box 300 is provided with 10 small boxes 310, and the material outlet 212 is aligned with one of the small boxes 310. After identification, the animals fall into the small boxes 310 through the material outlet 212, and the animals meeting the same classification requirements are placed in the same small box 310. It can be understood that in other embodiments, the number of small boxes 310 is set to 8 or 12. The number of small boxes 310 is not specifically limited in the present disclosure.

Referring to FIG. 3 and FIG. 4, the animal sorting device 10 further includes a screening device 400. The screening device 400 is disposed on the sorting box 200. The screening device 400 includes an RFID module 410 and a closing mechanism 420. The RFID module 410 is disposed in the screening channel 210 and can identify RFID tags of the animals and screen the animals. The closing mechanism 420 is rotatable relative to the sorting box 200 to close or open the material outlet 212 of the screening channel 210. When the closing mechanism 420 closes the material outlet 212, the animals are accommodated in the screening channel 210. When the closing mechanism 420 opens the material outlet 212 of the screening channel 210, the animals leave the screening channel 210 from the material outlet 212 and enter the placement box 300.

Referring to FIG. 3, it is to be noted that the RFID module 410 is disposed on a sidewall of the above second channel 214.

Referring to FIG. 4 and FIG. 5, the closing mechanism 420 includes a baffle plate 421 and a motor 422. The baffle plate 421 is connected to the motor 422. The motor 422 drives the baffle plate 421 to rotate to open or close the material outlet 212 of the second channel 214. When the animals are accommodated in the screening channel 210, the RFID module 410 identifies the RFID tags on the animals. After identification, the motor 422 drives the baffle plate 421 to rotate relative to the RFID module 410 to open the material outlet 212 of the second channel 214. At this time, the animals leave the material outlet 212 and enter the placement box 300. When the animals leave the second channel 214, the motor 422 drives the baffle plate 421 to rotate relative to the RFID module 410 to close the material outlet 212 of the second channel 214. It can be understood that the motor 422 may also not be provided, as long as there is any solution where the closing mechanism 420 can close or open the material outlet 212 of the screening channel 210, and the any solution should be protected.

In summary, in the present disclosure, the animal sorting device 10 includes the housing 100, the sorting box 200, the placement box 300, and the screening device 400, where the sorting box 200, the placement box 300, and the screening device 400 are all placed in the housing 100. The animals are placed in the sorting box 200, the tags on the animals are identified by the screening device 400, and the animals fall into different placement boxes 300 to implement sorting of the animals, thereby reducing the error rate of manual screening, and improving the efficiency of animal screening.

Referring to FIG. 3 and FIG. 4, the animal sorting device 10 further includes a rotary motor 500. The rotary motor 500 is electrically connected to the placement box 300. The rotary motor 500 can drive the placement box 300 to rotate relative to the sorting box 200. After the RFID module 410 completes the identification, the rotary motor 500 drives the placement box 300 to rotate relative to the sorting box 200 until the small box 310 into which the animals need to fall is aligned with the material outlet 212. By providing the rotary motor 500, the placement box 300 does not need to be manually rotated, the operation is convenient, and it can be ensured that the small box 310 is aligned with the material outlet 212, thereby avoiding the situation that the animals fall into other small boxes 310 or fall onto the bottom plate 112 as a rotation angle is too large or too small, and reducing the error rate. It can be understood that in the case of not considering convenient operation and reduced error rate, the rotary motor 500 may also not be provided, as long as there is any solution where the placement box 300 is rotatable relative to the sorting box 200, and the any solution should be protected.

Referring to FIG. 1 and FIG. 5, the animal sorting device 10 further includes a rotary table 600, where the placement box 300 is placed on the rotary table 600, and the rotary motor 500 drives the rotary table 600 to rotate relative to the sorting box 200, so that the placement box 300 is driven to rotate relative to the sorting box 200. The rotary table 600 is provided, and each small box 310 is detachably connected to the rotary table 600. When one of the small boxes 310 is full, the user can stop operating the animal sorting device 10, remove the small box 310 that is full from the rotary table 600, transfer the animals to another place, mount the small box 310 on the rotary table 600, and operate the animal sorting device 10 again. The entire placement box 300 does not need to be disassembled, and the operation is convenient. It can be understood that in the case of not considering convenient operation, the rotary table 600 may also not be provided, as long as there is any solution where the placement box 300 can be disassembled from the housing 100, and the any solution should be protected.

Referring to FIG. 1 and FIG. 6, the animal sorting device 10 further includes a through-beam grating protection device 700 and a positioning pin 800, where the through-beam grating protection device 700 is disposed on one side of the side plate 111 away from the bottom plate 112, the positioning pin 800 is disposed on the bottom plate 112 and connected to the placement box 300, and the through-beam grating protection device 700 includes an emitter, a receiver, and a control center, and a light beam emitted from the emitter is received by the receiver and forms a light curtain. When the user accidentally dips the hand into the housing 100 during use of the animal sorting device 10, the hand passes through the light curtain, and the light beam emitted from the emitter is interrupted. At this time, the receiver transmits an electrical signal to the control center, and the control center controls the positioning pin 800 to lock the placement box 300, so as to limit rotation of the placement box 300 relative to the sorting box 200. It can be understood that both the through-beam grating protection device 700 and the positioning pin 800 may not be provided, as long as there is any solution where the animal sorting device 10 can automatically implement sorting, and the any solution should be protected.

Referring to FIG. 1, the animal sorting device 10 further includes an electric control box 900, where the electric control box 900 provides a power supply for the screening device 400 and can control the screening device 400 to work. It can be understood that the electric control box 900 may also not be provided. In this case, the animal sorting device 10 is connected to an alternating current power supply, as long as there is any solution where the animal sorting device 10 can work, and the any solution should be protected.

Referring to FIG. 1, it is to be noted that the electric control box 900 is provided with a power supply switch 910, a sorting switch 920, and an emergency stop switch 930, where the power supply switch 910 controls a total power supply of the animal sorting device 10; the sorting switch 920 controls the power supply of the screening device 400; when the sorting switch 920 is turned on, the RFID module 410, the motor 422, and the rotary motor 500 work; when the sorting switch 920 is turned off, the RFID module 410, the motor 422, and the rotary motor 500 are turned off; and the emergency stop switch 930 is configured to cut off the power supply in case of emergency.

While the present disclosure has been described with reference to several typical embodiments, it should be understood that the terms used are illustrative and exemplary, but not limiting. As the present disclosure can be embodied in various forms without departing from the spirit or essence of the disclosure, it should be understood that the above embodiments are not limited to any of the aforementioned details, but should be broadly interpreted within the spirit and scope defined by the appended claims. Therefore, all changes and modifications falling within the scope of claims or their equivalents should be covered by the appended claims.

What is claimed is:

1. An animal sorting device, comprising:
    a housing;
    a sorting box located in the housing, wherein a screening channel is formed in the sorting box and is provided with a material inlet and a material outlet;
    a placement box that is located in the housing and communicates with the material outlet of the screening channel; and
    a screening device disposed on the sorting box, wherein the screening device comprises an RFID module and a closing mechanism, the RFID module is disposed in the screening channel and is capable of identifying RFID tags of animals, and the closing mechanism is capable of closing or opening the material outlet of the screening channel;
    wherein the screening channel comprises a first channel and a second channel that communicate with each other, the first channel communicates with the second channel, the material inlet is formed in the first channel, the material outlet is formed in the second channel and faces the placement box, the first channel extends along a vertical direction and communicates with the outside by the material inlet, an extension direction of the second channel is inclined to the vertical direction, and the RFID module is located on a sidewall of the second channel.

2. The animal sorting device according to claim 1, wherein the closing mechanism comprises a baffle plate and a motor, the baffle plate is connected to the motor, and the motor drives the baffle plate to rotate to open or close the material outlet.

3. The animal sorting device according to claim 1, further comprising a rotary motor that is electrically connected to the placement box and is capable of driving the placement box to rotate relative to the sorting box.

4. The animal sorting device according to claim 3, further comprising a rotary table, wherein the placement box is placed on the rotary table, and the rotary motor drives the rotary table to rotate relative to the sorting box, so that the placement box is driven to rotate relative to the sorting box.

5. The animal sorting device according to claim 1, wherein the housing comprises an outer housing and two door panels that are disposed on a same side surface of the outer housing and are both rotatably connected to the outer housing.

6. The animal sorting device according to claim 5, wherein each of the door panels is provided with a first magnetic attraction component, the outer housing is correspondingly provided with a second magnetic attraction component, and the first magnetic attraction component is magnetically attracted to the second magnetic attraction component to limit rotation of the door panel relative to the outer housing.

7. The animal sorting device according to claim 1, further comprising a through-beam grating protection device and a positioning pin, wherein the through-beam grating protection device is disposed on a side surface of the housing, the positioning pin is disposed on a bottom surface of the housing and connected to the placement box, and the through-beam grating protection device is capable of controlling the positioning pin to lock the placement box, so as to limit rotation of the placement box relative to the sorting box.

8. The animal sorting device according to claim 1, further comprising an electric control box that provides a power supply for the screening device and is capable of controlling the screening device to work.

9. The animal sorting device according to claim 1, further comprising an electric control box that provides a power supply for the screening device and is capable of controlling the screening device to work.

10. An animal sorting device, comprising:
    a housing;
    a sorting box located in the housing, wherein a screening channel is formed in the sorting box and is provided with a material inlet and a material outlet;
    a placement box that is located in the housing and communicates with the material outlet of the screening channel; and
    a screening device disposed on the sorting box, wherein the screening device comprises an RFID module and a closing mechanism, the RFID module is disposed in the screening channel and is capable of identifying RFID tags of animals, and the closing mechanism is capable of closing or opening the material outlet of the screening channel;
    wherein the animal sorting device further comprises a through-beam grating protection device and a positioning pin, wherein the through-beam grating protection device is disposed on a side surface of the housing, the positioning pin is disposed on a bottom surface of the housing and connected to the placement box, and the through-beam grating protection device is capable of controlling the positioning pin to lock the placement box, so as to limit rotation of the placement box relative to the sorting box.

\* \* \* \* \*